(12) United States Patent
Hable et al.

(10) Patent No.: US 11,289,718 B2
(45) Date of Patent: Mar. 29, 2022

(54) METHOD FOR OPERATING A FUEL CELL

(71) Applicants: AUDI AG, Ingolstadt (DE); VOLKSWAGEN AG, Wolfsburg (DE)

(72) Inventors: Wolfgang Hable, Braunschweig (DE); Christian Lucas, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 90 days.

(21) Appl. No.: 16/644,908

(22) PCT Filed: Aug. 17, 2018

(86) PCT No.: PCT/EP2018/072329
§ 371 (c)(1),
(2) Date: Mar. 5, 2020

(87) PCT Pub. No.: WO2019/048217
PCT Pub. Date: Mar. 14, 2019

(65) Prior Publication Data
US 2020/0266463 A1  Aug. 20, 2020

(30) Foreign Application Priority Data

Sep. 5, 2017 (DE) .................. 10 2017 215 514.0

(51) Int. Cl.
*H01M 8/04* (2016.01)
*H01M 8/04089* (2016.01)
(Continued)

(52) U.S. Cl.
CPC ......... *H01M 8/04097* (2013.01); *B60L 50/70* (2019.02); *B60L 58/30* (2019.02);
(Continued)

(58) Field of Classification Search
CPC ......... H01M 8/04097; H01M 8/04388; H01M 8/04402; H01M 8/04992
(Continued)

(56) References Cited

U.S. PATENT DOCUMENTS

2008/0319687 A1  12/2008  Kurosawa
2017/0301931 A1  10/2017  Jung et al.
2018/0375131 A1*  12/2018  Hauth ............... H01M 8/04402

FOREIGN PATENT DOCUMENTS

DE  10 2004 063 533 A1  7/2006
DE  10 2008 054 375 A1  6/2010
(Continued)

*Primary Examiner* — James M Erwin
(74) *Attorney, Agent, or Firm* — Seed Intellectual Property Law Group LLP

(57) ABSTRACT

The disclosure relates to a method for operating a fuel cell system and a correspondingly configured fuel cell system, comprising a fuel cell stack, an anode supply with a hydrogen reservoir, an anode supply path connecting the hydrogen reservoir to the fuel cell stack, a recirculation path connecting a fuel cell outlet to the anode supply path, and a conveying device for conveying recirculated anode exhaust gas. The method provides for a tank mass flow supplied from the hydrogen reservoir to the anode circuit to be determined by balancing the material flows supplied to and discharged from the anode circuit, wherein the tank mass flow enters the balancing as a material flow supplied to the anode circuit.

12 Claims, 1 Drawing Sheet

(51) Int. Cl.
  *B60L 50/70* (2019.01)
  *B60L 58/30* (2019.01)
  *H01M 8/0438* (2016.01)
  *H01M 8/04746* (2016.01)
  *H01M 8/04992* (2016.01)

(52) U.S. Cl.
  CPC ... *H01M 8/04388* (2013.01); *H01M 8/04402* (2013.01); *H01M 8/04753* (2013.01); *H01M 8/04992* (2013.01); *H01M 2250/20* (2013.01)

(58) Field of Classification Search
  USPC .......................................................... 429/415
  See application file for complete search history.

(56) References Cited

FOREIGN PATENT DOCUMENTS

| | | |
|---|---|---|
| DE | 10 2012 007 385 A1 | 10/2013 |
| DE | 10 2012 017 567 A1 | 3/2014 |
| DE | 10 2013 003 740 A1 | 9/2014 |
| DE | 10 2004 002 021 B4 | 10/2015 |
| DE | 10 2014 015 867 A1 | 4/2016 |
| DE | 10 2016 219 958 A1 | 4/2018 |
| JP | 2008-234970 A | 10/2008 |
| JP | 5013171 B2 | 8/2012 |

\* cited by examiner

METHOD FOR OPERATING A FUEL CELL

BACKGROUND

Technical Field

The invention relates to a method for operating a fuel cell and in particular for determining a tank mass flow supplied to the anode circuit. The invention also relates to a fuel cell system configured to perform the method.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (in most cases proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Generally, the fuel cell is formed by a plurality of MEAs arranged in a stack, the electrical power outputs of which add up. Between the individual membrane electrode assemblies, bipolar plates (also called flow-field plates or separator plates) are usually arranged, which ensure a supply of the individual cells with the operating media, i.e., the reactants, and are usually also used for cooling. In addition, the bipolar plates also ensure an electrically conductive contact to the membrane electrode assemblies.

While the fuel cell is operating, the fuel (anode operating medium), in particular hydrogen $H_2$, is supplied via an anode-side open flow-field of the bipolar plate to the anode where electrochemical oxidation of $H_2$ into protons $H^+$ with release of electrons ($H_2 \rightarrow 2\ H^+ + 2\ e^-$) occurs. Protons are transported (in a water-bound or water-free manner) from the anode chamber into the cathode chamber across the electrolyte or membrane that separates and electrically insulates the reaction chambers in a gastight manner from each other. The electrons provided at the anode are guided to the cathode via an electrical line. The cathode receives, as a cathode operating medium, oxygen or a gas mixture containing oxygen (such as air) via an open flow field of the bipolar plate on the cathode side, so that a reduction of $O_2$ to $O^{2-}$ with gain of electrons takes place ($\frac{1}{2}O_2 + 2\ e^- \rightarrow O^{2-}$). At the same time, the oxygen anions react in the cathode chamber with the protons transported across the membrane to form water ($O^{2-} + 2\ H^+ \rightarrow H_2O$).

The anode supply of a fuel cell comprises a pressure reservoir in which the fuel (generally hydrogen) is stored under high pressure and from which the fuel is supplied to the fuel cell. Usually, the anode exhaust gas discharged from the fuel cell is fed back into the anode supply line via a recirculation line in order to supply unused fuel to the fuel cell again. It is known to convey the recirculation gas by means of a jet pump to which the hydrogen is supplied on the pressure side as propellant gas stream (e.g., DE 10 2004 002 021 B4, DE 10 2012 007 385 A1, DE 10 2012 017 567 A1, DE 10 2013 003 740 A1, DE 10 2014 015 867 A1).

A challenge with fuel cell vehicles which has hitherto not been satisfactorily solved is the determination of the instantaneous consumption of hydrogen, i.e., the tank mass flow fed into the system from the pressure reservoir. The instantaneous consumption is of interest on the one hand in order to display it to a driver of a fuel cell vehicle or to determine a prospective range. Currently, the instantaneous consumption can only be determined by using additional sensors, for example, mass flow sensors and/or pressure sensors, which are arranged between the pressure reservoir downstream of a pressure control valve and the anode circuit.

BRIEF SUMMARY

Embodiments of the invention are based on the object of proposing a method for operating a fuel cell system which enables the determination of the tank mass flow preferably without additional sensors being arranged between the pressure reservoir and the anode circuit even in dynamic operating situations such as are typical for vehicle applications.

This object is achieved by a method as well as a fuel cell system having the features described herein.

The fuel cell system comprises a fuel cell stack and an anode supply for supplying the fuel cell stack with hydrogen. The anode supply has a hydrogen reservoir, an anode supply path connecting the hydrogen reservoir to the fuel cell stack, a recirculation path (indirectly or directly) connecting a fuel cell outlet to the anode supply path, and a conveying device for conveying recirculated anode exhaust gas. The method provides for a tank mass flow supplied from the hydrogen reservoir to the anode circuit to be determined by balancing the material flows ($\dot{n}$, $\dot{m}$) supplied to and discharged from the anode circuit, wherein the tank mass flow enters the balancing as a material flow supplied to the anode circuit.

By balancing the supplied and discharged material flows as described herein, the tank mass flow representing the net instantaneous consumption of the fuel cell stack can be determined even in dynamic operating situations without the arrangement of pressure sensors or mass flow sensors in the anode supply path between pressure reservoir and anode circuit.

Mass flows (formula symbol: $\dot{m}$, unit g/s) or amount of substance flows (formula symbol: $\dot{n}$, unit mol/s) are referred to herein as material flows. The two variables can be converted into each other via the molar mass (formula symbol M, unit g/mol) of the respective substance or mixtures of substances.

Preferably, hydrogen consumed by the fuel cell stack as a result of the fuel cell reactions enters the balancing as material flow discharged from the anode circuit. This stack consumption can be calculated in particular as a function of an electrical current generated by the fuel cell stack, for example, via the Faraday relationship.

Furthermore, it is preferred that the balancing includes anode exhaust gas which is discharged from the anode circuit via actuating means, in particular valves. This discharged anode exhaust gas enters the balancing as a discharged material flow. In particular, taken into account here is an anode exhaust gas which is discharged from the anode circuit via a so-called flush valve, in particular when the nitrogen fraction diffused into the anode chambers via the polymer electrolyte membrane of the fuel cell exceeds a predetermined threshold. The material flow of the anode exhaust gas discharged via valves can be determined, for example, by means of models or characteristic diagrams of the valves.

In one embodiment of the invention, nitrogen diffused into the anode circuit enters the balancing as a material flow supplied to the anode circuit. For example, the nitrogen may diffuse from the cathode chamber into the anode chamber via the polymer electrolyte membrane of the fuel cell. By taking into account the diffused nitrogen, the accuracy of the determination is further improved. However, since the nitrogen material flow is generally comparatively low, it may also be neglected in a good approximation in an alternative development, whereby the method is simplified.

In a preferred development, the tank mass flow is balanced using mass flow signals and/or pressure signals which are exclusively obtained by mass flow sensors or pressure sensors arranged downstream of the jet pump (26). In particular, the balancing can be carried out with good accuracy solely on the basis of the procedure explained above and optionally with the use of sensors which are already present in the anode circuit. Dispensing with additional mass flow sensors or pressure sensors means reducing the cost and complexity of the system.

Another aspect of the invention relates to a fuel cell system that has a fuel cell stack as described herein. In particular, the fuel cell system has an anode supply and a cathode supply with the corresponding peripheral components in addition to the fuel cell stack.

The tank mass flow thus determined can be used for various purposes during operation of the fuel cell system. In one development, the tank mass flow is used as the instantaneous consumption of the fuel cell system for operating the same. In particular, it is displayed to a driver of a fuel cell vehicle so that the driver can adapt his driving behavior in the sense of minimizing consumption. In addition, the instantaneous consumption can be used for forecasting a range of the fuel cell vehicle, which in turn can be indicated to the driver.

Furthermore, in a fuel cell system in which the conveying device of the recirculated anode gas is designed as a jet pump (ejector) which is connected to the hydrogen reservoir on the pressure inlet side, to the recirculation path on the suction side and to the fuel cell stack on the outlet side, the determined tank mass flow can be used as input parameter for modeling the jet pump. The tank mass flow in this case corresponds to the propellant flow of the jet pump present on the pressure inlet side, which flow can otherwise only be detected by means of additional sensors. In particular, in this development, the determination of the recirculated material flow and/or of the material flow at the entry into the fuel cell stack can be determined using the jet pump model. These parameters are important in order to regulate, for example, the hydrogen dosing or the flush cycles of the anode gas during operation of the fuel cell system.

A further aspect of the invention relates to a corresponding fuel cell system which is configured to carry out the method described herein. For this purpose, the system has, for example, a control device in which the necessary algorithms, in particular for carrying out the balancing, are stored in computer-readable form. The control device can also contain necessary characteristic diagrams and the like, which are required for carrying out the method.

Another aspect of the invention relates to a vehicle having a fuel cell system as described herein. The vehicle is preferably an electric vehicle in which an electrical energy generated by the fuel cell system serves to supply an electric traction motor and/or a traction battery.

Aspects and features of the various embodiments of the invention mentioned in this application may be combined advantageously with each other unless stated otherwise in individual cases.

BRIEF DESCRIPTION OF THE SEVERAL VIEWS OF THE DRAWINGS

The invention is explained below in exemplary embodiments in reference to the respective drawings. The following is shown.

DETAILED DESCRIPTION

Figure 1:
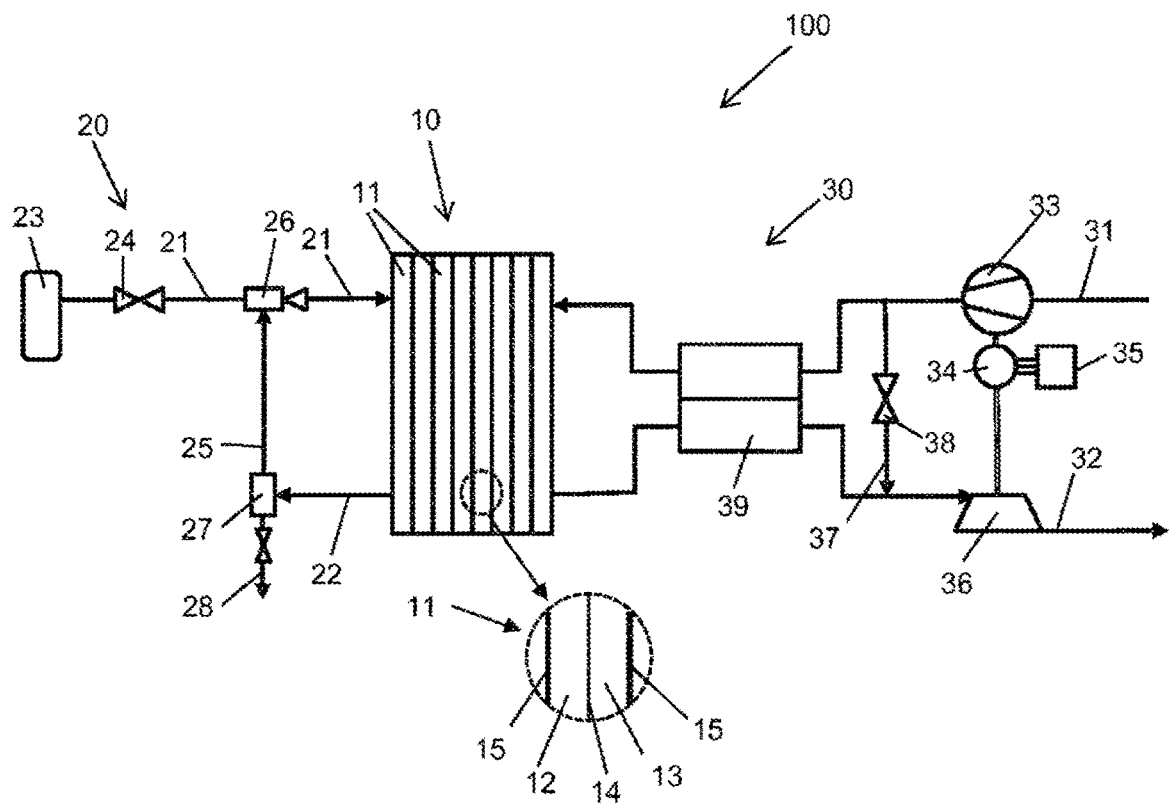
FIG. 1 is a block diagram of a fuel cell system according to one embodiment.

FIG. 1 shows a fuel cell system, denoted overall by 100, according to one embodiment. The fuel cell system 100 is part of a vehicle (not shown), in particular an electric vehicle, which has an electric traction motor, which is supplied with electrical energy by the fuel cell system 100.

The fuel cell system 100 comprises as core components a fuel cell stack 10, which comprises a plurality of individual cells 11, which are arranged in the form of a stack and which are formed by alternately stacked membrane electrode assemblies (MEAS) 14 and bipolar plates 15 (see detailed view). Each individual cell 11 thus comprises, in each case, an MEA 14 which has an ionically conductive polymer electrolyte membrane (not shown in detail), as well as catalytic electrodes arranged on both sides, namely an anode and a cathode which catalyze the respective partial reaction of the fuel cell conversion and may in particular be designed as coatings on the membrane. The anode electrode and cathode electrode have a catalytic material, for example, platinum, which is supported on an electrically conductive carrier material with a large specific surface, for example, a carbon-based material. An anode chamber 12 is thus formed between a bipolar plate 15 and the anode, and the cathode chamber 13 is thus formed between the cathode and the next bipolar plate 15. The bipolar plates 15 serve to supply the operating media into the anode and cathode chambers 12, 13 and also establish the electrical connection between the individual fuel cells 11. In addition, they have a system of inner coolant channels, which serve the passage of a coolant and thus the temperature control of the stack 10. Optionally, gas diffusion layers can be arranged between the membrane electrode assemblies 14 and the bipolar plates 15.

In order to supply the fuel cell stack 10 with the operating media, the fuel cell system 100 comprises, on the one hand, an anode supply 20 and, on the other hand, a cathode supply 30.

The anode supply 20 comprises an anode supply path 21, which serves to supply an anode operating medium (fuel), here hydrogen, to the anode chambers 12 of the fuel cell stack 10. For this purpose, the anode supply path 21 connects a fuel reservoir (pressure reservoir) 23 to an anode inlet of the fuel cell stack 10. The anode supply 20 also comprises an anode exhaust path 22 which discharges the anode exhaust gas from the anode chambers 12 via an anode outlet of the fuel cell stack 10. The anode operating pressure on the anode sides 12 of the fuel cell stack 10 is adjustable via a pressure control valve 24 in the anode supply path 21. Furthermore, the anode supply 20 has a recirculation line 25, which connects the anode exhaust path 22 to the anode supply path 21. The sum of anode exhaust path 22 and recirculation line 25 is also referred to herein as recirculation path. A conveying device 26 causes the anode exhaust gas to be conveyed. In the system shown, the conveying device 26 is designed as a gas jet pump which is arranged at the point where the recirculation line 25 opens into the anode supply path 21. Recirculation of fuel is customary in order to return the fuel, which is mostly used superstoichiometrically with respect to the fuel cell reaction, to the stack. A flushing line 28 branches off from the anode exhaust path 22 and allows the anode exhaust gas to be discharged from time to time. This flushing occurs in particular when the nitrogen concentration in the recirculated gas rises too much as a result of diffusion of nitrogen from the cathode chambers 13 into the anode chambers 12 of the fuel cells 11. The flushing processes take place via actuation of a flush valve 27 which is designed here as a combined water separation valve.

The cathode supply 30 comprises a cathode supply path 31 which supplies an oxygen-containing cathode operating medium to the cathode chambers 13 of the fuel cell stack 10, in particular air which is sucked in from the environment. The cathode supply 30 also comprises a cathode exhaust path 32, which discharges the cathode exhaust gas (in particular the exhaust air) from the cathode chambers 13 of the fuel cell stack 10 and supplies it, if appropriate, to an exhaust system (not shown). A compressor 33 is arranged in the cathode supply path 31 for conveying and compressing the cathode operating medium. In the embodiment shown, the compressor 33 is designed as a compressor which is driven mainly by an electric motor, the drive of said compressor being effected via an electric motor 34 equipped with a corresponding power electronics system 35. The compressor 33 may also be driven via a common shaft by a turbine 36 (optionally with variable turbine geometry) disposed in the cathode exhaust path 32.

In accordance with the illustrated exemplary embodiment, the cathode supply 30 can also have a wastegate line 37 which connects the cathode supply path 31 to the cathode exhaust path 32, i.e., a bypass of the fuel cell stack 10. The wastegate line 37 allows excess air mass flow past the fuel cell stack 10 without shutting down the compressor 33. An actuating means such as a wastegate valve 38 arranged in the wastegate line 37 serves to control the amount of the cathode operating medium bypassing the fuel cell stack 10. All actuating means 24, 38 of the fuel cell system 100 can be designed as controllable or non-controllable valves or flaps. Corresponding additional actuating means may be arranged in the lines 21, 22, 31 and 32 in order to be able to isolate the fuel cell stack 10 from the environment.

The fuel cell system 100 can furthermore have a humidifier 39. The humidifier 39 is on the one hand arranged in the cathode supply path 31 such that the cathode operating gas can flow through it. On the other hand, the arrangement in the cathode exhaust path 32 allows the cathode exhaust gas to flow through it. The humidifier 39 typically has a plurality of membranes permeable by water vapor which are designed to be either flat or in the form of hollow fibers. In this case, the comparatively dry cathode operating gas (air) flows over one side of the membranes and the comparatively moist cathode exhaust gas (exhaust gas) flows over the other side. Driven by the higher partial pressure of the water vapor in the cathode exhaust gas, water vapors pass over the membrane into the cathode operating gas, which is humidified in this way.

Various further details of the anode and cathode supply 20, 30 are not shown in the simplified FIG. 1 for reasons of clarity. A water separator may furthermore be installed in the cathode exhaust path 32 in order to condense and drain product water arising from the fuel cell reaction. The flushing line 28 may moreover open into the cathode exhaust path 32 so that the anode exhaust gas and the cathode exhaust gas are discharged via a common exhaust system.

Figure 2:
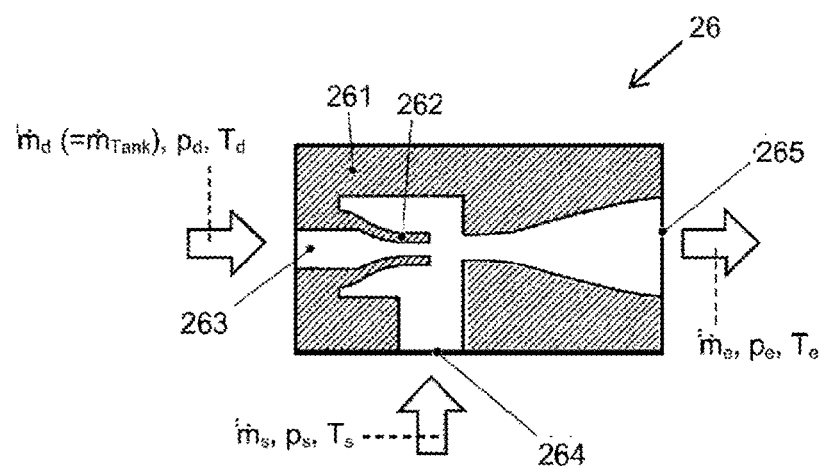
FIG. 2 is a schematic detail view of the jet pump of the fuel cell system in FIG. 1.

The basic structure and functionality of the jet pump (ejector) 26 is illustrated in FIG. 2. The jet pump 26 shown comprises a base body 261 with a drive nozzle 262 formed therein. The jet pump 26 also has three connections, namely a pressure inlet 263, to which the hydrogen from the tank 23 is applied as a fuel mass flow $\dot{m}_d$, a suction inlet or vacuum connection 264 into which the recirculation line 25 opens, and an outlet 265. Diverging from the example shown in FIG. 2, the jet pump 26 may also be designed to be regulatable. Also shown in FIG. 2 are some parameters (pressure p, temperature T and mass flow $\dot{m}$) of the propellant flow (index d) present at the jet pump 26 on the pressure inlet side, of the recirculated anode exhaust gas flow (index s) present on the suction side, and of the anode gas (index e) on the outlet side.

The manner in which the tank mass flow is determined according to the method described herein and used in a jet pump model is described below with reference to preferred embodiments.

Calculation of Tank Mass Flow (Fuel Mass Flow of the Jet Pump)

For the amount of substance change Δn occurring between two times $t_1$ and $t_2$ in the anode circuit, balancing according to equation (1) is used where $\Delta t = t_2 - t_1$.

$$\Delta n / \Delta t = \dot{n}_{tank} + \dot{n}_{N2} - (\dot{n}_{H2,stack} + \dot{n}_{valve}) \tag{1}$$

Herein, $\dot{n}_{tank}$ corresponds to the amount of substance flow of hydrogen, which is supplied from the hydrogen reservoir 23 to the anode circuit and which is present on the pressure side at the jet pump 26 (as fuel mass flow $\dot{m}_d$); $\dot{n}_{N2}$ corresponds to the nitrogen flow diffused into the anode circuit; $\dot{n}_{H2,stack}$ corresponds to the hydrogen consumed by the fuel cell reaction occurring in the fuel cell stack 10; and $\dot{n}_{valve}$ valve corresponds to the anode exhaust gas discharged from the system, in particular via the flush valve 27. The tank mass flow $\dot{m}_{tank}$ sought is obtained by converting equation (1) to equation (2) and converting the amount of substance flow $\dot{n}_{tank}$ into a mass flow using the molar mass M according to equation (3). If pure hydrogen is fed from the tank into the system, the molar mass of hydrogen ($M_{H2}=2.0158$ g/mol) can be used.

$$\dot{n}_{tank} = \Delta n / \Delta t - [\dot{n}_{N2} - (\dot{n}_{H2,stack} + \dot{n}_{valve})] \tag{2}$$

$$\dot{m}_{tank} = \frac{\dot{n}_{tank}}{M_{H2}} \tag{3}$$

The general gas equation (4) can be used to calculate the amount of substance change Δn between the times $t_1$ and $t_2$ in a volume V, assuming an ideal gas. In principle, the influence of the pressure and the temperature can be taken into account. However, since the influence of the temperature is low, the assumption of a constant temperature between times $t_1$ and $t_2$ is acceptable so that equations (6) and (7) result for the amount of substance change $\Delta n = n_2 - n_1$ between times $t_1$ and $t_2$ via equation (5).

$$pV = nRT \tag{4}$$

$$\frac{p_2}{p_1} = \frac{n_2}{n_1} = 1 + \frac{\Delta n}{n_1} \tag{5}$$

-continued $$\Delta n = n_1\left(\frac{p_2}{p_1} - 1\right) \quad (6)$$

$$n_1 = \frac{p_1 V}{RT_1} \quad (7)$$

R is the ideal gas constant, $p_1$ is the pressure at time $t_1$; $p_2$ is the pressure at time $t_2$; $n_1$ is the amount of substance (in mol) in the control volume V at time $t_1$; $n_2$ is the amount of substance in the control volume V at time $t_2$; and $T_1$ or T is the temperature assumed to be constant. The control volume V is equal to the volume of the entire anode circuit and thus comprises the sum of the volumes of lines 21 (between the jet pump 26 and the stack inlet), 22 and 25, the volumes of the anode chambers 12 of the stack 10 and of the conveying device 26 and the valve 27. Thus, after insertion of equation (7) into (6), $\Delta n$ can be determined solely from the pressure measured in the control volume of the anode circuit at times $t_1$ and $t_2$ and from the temperature. The control volume V can also be divided into a plurality of partial volumes, the sum of all partial volumes being equal to the volume of the anode circuit. For example, the control volume V can be divided into a section from the conveying device 26 to the center of the stack 10 (high-pressure part of the anode circuit) and the section from the center of the stack to the conveying device (low-pressure part of the anode circuit) and $\Delta n$ can be determined for each of these partial volumes. The pressure and temperature parameters then relate in each case to the partial volume where they are detected using sensors which are installed (not shown in FIG. 1).

The hydrogen consumption $\dot{n}_{H2,stack}$ occurring in the fuel cell stack 10 can be determined using equation (8), where I is the current intensity of the fuel cell stack 10, F is the Faraday constant, and N is the number of cells 11 in the stack 10.

$$\dot{n}_{H2,stack} = \frac{I}{2F} N \quad (8)$$

The anode exhaust gas discharged via valves and the like, in particular via the flush valve 27, enters the balancing according to equation (1) or (2) as a material flow $\dot{n}_{valve}$ discharged from the anode circuit. Various methods, for example, the use of kv values, can be used for the calculation. A preferred method uses the model of Saint-Venant and Wantzel according to equations (9) and (10).

$$\dot{n}_{valve} = \frac{\alpha A \psi \sqrt{2\rho_{in} p_{in}}}{M_{control} \text{volume}} \cdot S \quad (9)$$

$$\psi = \sqrt{\frac{\kappa}{\kappa - 1}\left[\left(\frac{p_{out}}{p_{in}}\right)^{\frac{2}{\kappa}} - \left(\frac{p_{out}}{p_{in}}\right)^{\frac{\kappa+1}{\kappa}}\right]} \quad (10)$$

Here, A is the valve cross-section; $\alpha$ is the constriction factor (which can be determined experimentally); $\rho$ is the gas density; $p_{in}$ and $p_{out}$ are the inlet pressure and outlet pressure respectively; M is the molar mass of the gas volume in the control volume; $\kappa$ is the isentropic exponent; and S is a function with respect to the state of the valve (S=1 means the valve is open and S=0 means the valve is closed).

The nitrogen material flow $\dot{n}_{N2}$ that entered the anode circuit may be calculated, for example, as a change in the amount of substance of nitrogen $\Delta n_{N2}$ in the control volume by means of the $N_2$ substance amount fractions $\chi_{N2}$ according to equation (11), where $\chi_{N2,1}$ is the substance amount fraction of nitrogen at time $t_1$; $\chi_{N2,2}$ is the substance amount fraction of nitrogen at time $t_2$; $n_1$ is the total amount of substance ($H_2$, $N_2$ and possibly $H_2O$) at time $t_1$; and $n_2$ is the total amount of substance at time $t_2$. (The determination of the gas composition in the anode circuit and thus of the $N_2$ substance amount fractions takes place via a broad model (or in a combination of two or more models) and can be assumed to be known.)

$$\Delta n_{N2} = x_{N2,2} n_2 - x_{N2,1} n_1 = x_{N2,2}(n_1 + \Delta n) - x_{N2,1} n_1 = (x_{N2,2} - x_{N2,1}) n_1 + x_{N2,2} \Delta n = \Delta x_{N2} n_1 + x_{N2,2} \Delta n \quad (11)$$

Alternatively, in order to determine $\dot{n}_{N2}$ or $\Delta n_{N2}$, other models that directly calculate this value, such as nitrogen diffusion models, can also be used.

Since the influence of the change in the nitrogen fraction in the anode circuit due to diffusion through the stack is low in most cases, in a good approximation $\dot{n}_{N2}$ can also be neglected in the balancing in equation (1) or (3).

The tank mass flow $\dot{m}_{tank}$ determined in this way corresponds to the instantaneous consumption of hydrogen and can be used as such to display it to a driver and/or to determine a predicted range of the vehicle. Furthermore, the tank mass flow $\dot{m}_{tank}$ may be used in a model of the jet pump 26 to determine other parameters for the control of the fuel cell system.

Modeling the Jet Pump

The mass flow $\dot{m}_s$ of the anode exhaust gas recirculated via the recirculation line 25 (i.e., $H_2$, $N_2$ and $H_2O$) corresponds to the mass flow $\dot{m}_s$ taken in by the suction nozzle 264 of the jet pump 26 and can be described as a multi-dimensional characteristic diagram. In particular, the recirculated mass flow $\dot{m}_s$ can be described according to equation (12) as a function of the pressure $p_d$, temperature $T_d$ and mass flow $\dot{m}_d$ of the hydrogen flow (fuel flow) flowing into the jet pump 26 on the pressure side; the pressure $p_s$, temperature $T_s$ and $H_2$ substance amount fraction $x_s$ of anode exhaust gas recirculated on the suction side via the recirculation line 25 into the jet pump 26, and also of the pressure $p_e$ of the anode gas emerging from the jet pump 26 (see also FIG. 2).

$$\dot{m}_s = f(p_d, T_d, \dot{m}_d, p_s, T_s, x_s, p_e) \quad (12)$$

In this case, the fuel mass flow Ina corresponds to the tank mass flow $\dot{m}_{tank}$ determined above. Possible characteristic diagrams, in which the necessary data can be reduced, are the Körting characteristic diagrams.

Determination of the Drive Nozzle Inlet Pressure $P_d$

The fuel mass flow $\dot{m}_d$ can also be used to determine the drive nozzle pressure pa in order to thus be able to dispense with a direct measurement by means of a pressure sensor. Various approaches for determining the drive nozzle pressure $p_d$ are possible. For example, the drive nozzle pressure $p_d$ can be determined on the basis of empirical equations or characteristic diagrams, which are obtained from measurement data and represent the pressure pa as a function of the fuel mass flow $\dot{m}_d$.

Alternatively, the drive nozzle pressure pa can be calculated analytically as a function of the fuel mass flow $\dot{m}_d$ using the following equations. However, the pressure must be calculated iteratively in this case. In the calculation of the drive nozzle pressure $p_d$, a distinction of cases between the presence of a critical flow and of a subcritical flow is made on the basis of equation (13). If the suction pressure $p_s$ is less than or equal to the critical pressure $p_{crit}$ ($p_{crit} \geq p_{suction}$), a critical flow exists, to which equation (14) applies. Otherwise, there is a subcritical flow and equation (15) applies.

$$\frac{p_{crit}}{p_d} = \left(\frac{2}{\kappa+1}\right)^{\frac{\kappa}{\kappa-1}} \quad (13)$$

$$\dot{m}_{crit} = \alpha A \sqrt{2 p_d \rho_d \frac{\kappa}{\kappa-1}\left(\frac{2}{\kappa+2}\right)^{\frac{2}{\kappa-1}}} \quad (14)$$

$$\frac{\dot{m}}{\dot{m}_{crit}} = \sqrt{\frac{\kappa+1}{\kappa-1}\left(\frac{\kappa+1}{2}\right)^{\frac{2}{\kappa-1}}\left[\left(\frac{p_s}{p_d}\right)^{\frac{2}{\kappa}} - \left(\frac{p_s}{p_d}\right)^{\frac{\kappa+1}{\kappa}}\right]} \quad (15)$$

Energy Equation for the Jet Pump Model

The tank mass flow $\dot{m}_{tank}$ (=fuel mass flow $\dot{m}_d$) can also be used to calculate other variables via the energy equation of the jet pump (16) or (17). For example, the temperature $T_e$ at the jet pump outlet can be calculated and a temperature sensor can thus be saved. The term $\dot{Q}_{internal}$ takes into account the heat that is stored in the component (jet pump) or dissipated by the component.

$$\dot{m}_s h_s + \dot{m}_d h_d = \dot{m}_e h_e + \dot{Q}_{internal} \quad (16)$$

$$\dot{m}_s c_{p,s} T_s + \dot{m}_d c_{p,H2} T_e = \dot{m}_e c_{p,e} T_e + \dot{Q}_{internal} \quad (17)$$

$$\dot{Q}_{internal} = kA_{internal}(T_e - T_{JP}) \quad (18)$$

According to the first principle of thermodynamics, the following equations, which take into account the heat capacity $C_{JP}$ and the mass $m_{JP}$ of the jet pump 26, also apply. The heat exchange with the environment "u" is also taken into account here.

$$m_{JP} C_{JP} \frac{dT_{JP}}{dt} = \dot{Q}_{internal} + \dot{Q}_{external} \quad (19)$$

$$\dot{Q}_{external} = kA_{external}(T_u - T_{JP}) \quad (20)$$

The differential equation (19) can be solved either numerically or analytically. The ambient temperature can be assumed to be the starting value for solving the differential equation if the downtime of the vehicle was sufficiently long. The factors $kA_{internal}$ and $kA_{external}$ in this case are parameters which can be determined by means of component measurements.

In general, in the following claims, the terms used should not be construed to limit the claims to the specific embodiments disclosed in the specification and the claims, but should be construed to include all possible embodiments along with the full slope of equivalents to which such claims are entitled.

The invention claimed is:

1. A method for operating a fuel cell system of a fuel cell vehicle, the fuel cell system comprising a fuel cell stack, an anode supply with a hydrogen reservoir, an anode supply path connecting the hydrogen reservoir to the fuel cell stack, a recirculation path connecting a fuel cell outlet to the anode supply path, and a conveying device for conveying recirculated anode exhaust gas, the method comprising:
  determining a tank mass flow supplied from the hydrogen reservoir to an anode circuit by balancing material flows supplied to and discharged from the anode circuit, wherein the tank mass flow enters the balancing as a material flow supplied to the anode circuit; and
  displaying the determined tank mass flow to a driver of the fuel cell vehicle.

2. The method according to claim 1, wherein hydrogen consumed by the fuel cell stack enters the balancing as a material flow which is discharged from the anode circuit and which is calculated as a function of an electrical current generated by the fuel cell stack.

3. The method according to claim 1, wherein an anode exhaust gas, discharged via valves, enters the balancing as a material flow discharged from the anode circuit.

4. The method according to claim 1, wherein nitrogen diffused into the anode circuit enters the balancing as a material flow supplied to the anode circuit.

5. The method according to claim 1, wherein mass flow signals and/or pressure signals which are obtained exclusively from mass flow sensors or pressure sensors arranged downstream of a jet pump are used for balancing the tank mass flow.

6. The method according to claim 1, wherein the conveying device is designed as a jet pump which is connected to the hydrogen reservoir on the pressure inlet side, to the recirculation path on the suction side, and to the fuel cell stack on the outlet side, and the determined tank mass flow is used as an input parameter for modeling the jet pump and determining the recirculated material flow and/or the material flow at the inlet into the fuel cell stack.

7. A fuel cell system comprising a fuel cell stack and an anode supply with a hydrogen reservoir, an anode supply path connecting the hydrogen reservoir to the fuel cell stack, a recirculation path connecting a fuel cell outlet to the anode supply path, and a conveying device for conveying recirculated anode exhaust gas, the fuel cell system being configured to carry out a method comprising determining a tank mass flow supplied from the hydrogen reservoir to an anode circuit by balancing material flows supplied to and discharged from the anode circuit, wherein the tank mass flow enters the balancing as a material flow supplied to the anode circuit, and displaying the determined tank mass flow to a driver of a fuel cell vehicle incorporating the fuel cell system.

8. A vehicle comprising a fuel cell system including a fuel cell stack and an anode supply with a hydrogen reservoir, an anode supply path connecting the hydrogen reservoir to the fuel cell stack, a recirculation path connecting a fuel cell outlet to the anode supply path, and a conveying device for conveying recirculated anode exhaust gas, the fuel cell system being configured to carry out a method comprising determining a tank mass flow supplied from the hydrogen reservoir to an anode circuit by balancing material flows supplied to and discharged from the anode circuit, wherein the tank mass flow enters the balancing as a material flow supplied to the anode circuit, and displaying the determined tank mass flow to a driver of a fuel cell vehicle incorporating the fuel cell system.

9. The method according to claim 1, further comprising operating the fuel cell vehicle in response to the determined tank mass flow.

10. The method according to claim 9, wherein operating the fuel cell vehicle in response to the determined tank mass flow includes reducing consumption of hydrogen fuel by the fuel cell vehicle.

11. The method according to claim 1, further comprising using the determined tank mass flow to forecast a range of the fuel cell vehicle.

12. The method according to claim 11, further comprising displaying the forecasted range to the driver of the fuel cell vehicle.

* * * * *